US012148549B2

(12) United States Patent
Kennefick

(10) Patent No.: US 12,148,549 B2
(45) **Date of Patent: *Nov. 19, 2024**

(54) FLUOROPOLYMER INSULATED COMMUNICATIONS CABLE

(71) Applicants: DAIKIN AMERICA, INC., Orangeburg, NY (US); DAIKIN INDUSTRIES, LTD., Osaka (JP)

(72) Inventor: Daniel J. Kennefick, Newark, DE (US)

(73) Assignees: DAIKIN AMERICA, INC., Orangeburg, NY (US); DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,531

(22) Filed: Nov. 30, 2023

(65) Prior Publication Data

US 2024/0112828 A1 Apr. 4, 2024

Related U.S. Application Data

(63) Continuation of application No. 17/967,269, filed on Oct. 17, 2022, now Pat. No. 11,875,911, which is a continuation of application No. 17/306,158, filed on May 3, 2021, now Pat. No. 11,515,060, which is a continuation of application No. 16/896,973, filed on Jun. 9, 2020, now Pat. No. 11,024,443, which is a continuation of application No. 16/415,186, filed on May 17, 2019, now Pat. No. 10,734,133.

(60) Provisional application No. 62/738,569, filed on Sep. 28, 2018.

(51) Int. Cl.

| | |
|---|---|
| ***H01B 3/44*** | (2006.01) |
| ***H01B 3/28*** | (2006.01) |
| ***H01B 3/30*** | (2006.01) |
| ***H01B 7/02*** | (2006.01) |
| ***H01B 7/29*** | (2006.01) |

(52) U.S. Cl.

CPC ............... *H01B 3/445* (2013.01); *H01B 3/28* (2013.01); *H01B 3/302* (2013.01); *H01B 7/0216* (2013.01); *H01B 7/292* (2013.01)

(58) Field of Classification Search

CPC ...... H01B 3/445; H01B 7/292; H01B 7/0216; H01B 3/02; H01B 3/28

See application file for complete search history.

(56) References Cited

U.S. PATENT DOCUMENTS

| | | | | |
|---|---|---|---|---|
| 6,064,008 | A | 5/2000 | Craton | |
| 6,139,957 | A | 10/2000 | Craton | |
| 6,403,887 | B1 * | 6/2002 | Kebabjian .......... | H01B 11/1025 174/113 R |
| 10,026,522 | B1 | 7/2018 | Gebs | |
| 2003/0150638 | A1 | 8/2003 | Patel | |

(Continued)

*Primary Examiner* — Sherman Ng

(74) *Attorney, Agent, or Firm* — Sughrue Mion, PLLC

(57) ABSTRACT

A communications cable is provided that includes a pair of twisted pair of wires, each coated with a fluoropolymer insulator. The twisted pair of wires is configured to carry a differential signal, such as a differential data signal and/or a differential power signal. The fluoropolymers are highly effective insulators and significantly reduce both the effects of internal and external electromagnetic interference while maintaining low cable attenuation, even when operating within a temperature range of −40° C. to 150° C.

15 Claims, 16 Drawing Sheets

(56) References Cited

U.S. PATENT DOCUMENTS

| | | | | |
|---|---|---|---|---|
| 2008/0066947 | A1* | 3/2008 | Glew | G02B 6/4489<br>174/131 A |
| 2008/0264671 | A1 | 10/2008 | Kenny et al. | |
| 2011/0220387 | A1* | 9/2011 | Szylakowski | H01B 7/295<br>174/113 C |
| 2013/0161058 | A1* | 6/2013 | Camp, II | H01B 7/295<br>174/102 R |
| 2016/0133355 | A1* | 5/2016 | Glew | H02G 3/0481<br>248/49 |
| 2016/0225487 | A1* | 8/2016 | Koeppendoerfer | H01B 7/0216 |
| 2018/0301245 | A1 | 10/2018 | Glew | |
| 2018/0304245 | A1* | 10/2018 | Sunley | B01J 37/0009 |

* cited by examiner

| DC | 1GHz | 2.5GHz | 5GHz | 10GHz |
|---|---|---|---|---|
| FEP @ -40C | 2.040 | 2.048 | 2.060 | 2.068 |
| FEP @ 23C | 2.017 | 2.026 | 2.028 | 2.041 |
| FEP @ 105C | 1.994 | 1.997 | 1.997 | 2.011 |
| FEP @ 150C | | 1.990 | | |
| XLPE @ -40C | 2.296 | 2.298 | 2.314 | 2.328 |
| XLPE @ 23C | 2.249 | 2.260 | 2.263 | 2.281 |
| XLPE @ 105C | 2.154 | 2.188 | 2.192 | 2.203 |
| XLPE @ 150C | | 2.126 | | |

FIG. 3

| DF | 1GHz | 2.5GHz | 5GHz | 10GHz |
|---|---|---|---|---|
| FEP @ -40C | 0.000119 | 0.000089 | 0.000068 | 0.000042 |
| FEP @ 23C | 0.000444 | 0.000375 | 0.000297 | 0.000262 |
| FEP @ 105C | 0.000737 | 0.000718 | 0.000633 | 0.000576 |
| FEP @ 150C | | 0.000851 | | |
| XLPE @ -40C | 0.000207 | 0.000145 | 0.000131 | 0.000104 |
| XLPE @ 23C | 0.000372 | 0.000361 | 0.000304 | 0.000303 |
| XLPE @ 105C | 0.000602 | 0.000645 | 0.000643 | 0.000637 |
| XLPE @ 150C | | 0.000872 | | |

FIG. 6

| ATTENUATION = (l/L)x(axf^0.5+bxf^1+cxf^-0.5) | | | | | | | | |
|---|---|---|---|---|---|---|---|---|
| f | XLPE 1GHz | FEP 1GHz | XLPE 2.5GHz | FEP 2.5GHz | XLPE 5GHz | FEP 5GHz | XLPE 10GHz | FEP 10Ghz |
| 1 | 0.3 | 0.3 | 0.3 | 0.3 | 0.3 | 0.3 | 0.3 | 0.3 |
| 2 | 0.4 | 0.4 | 0.4 | 0.4 | 0.4 | 0.4 | 0.4 | 0.4 |
| 5 | 0.6 | 0.5 | 0.6 | 0.5 | 0.6 | 0.5 | 0.6 | 0.5 |
| 10 | 0.8 | 0.7 | 0.8 | 0.7 | 0.8 | 0.8 | 0.8 | 0.8 |
| 20 | 1.1 | 1.0 | 1.1 | 1.1 | 1.1 | 1.1 | 1.1 | 1.1 |
| 50 | 1.8 | 1.7 | 1.8 | 1.7 | 1.8 | 1.7 | 1.8 | 1.7 |
| 100 | 2.5 | 2.3 | 2.5 | 2.3 | 2.5 | 2.3 | 2.5 | 2.3 |
| 200 | 3.5 | 3.3 | 3.5 | 3.3 | 3.5 | 3.3 | 3.5 | 3.3 |
| 500 | 5.5 | 5.2 | 5.5 | 5.2 | 5.5 | 5.2 | 5.6 | 5.2 |
| 1000 | 7.8 | 7.4 | 7.8 | 7.4 | 7.9 | 7.4 | 7.9 | 7.4 |
| 2000 | 11.1 | 10.5 | 11.1 | 10.4 | 11.1 | 10.5 | 11.1 | 10.5 |
| 5000 | 17.6 | 16.6 | 17.6 | 16.5 | 17.6 | 16.6 | 17.6 | 16.6 |
| 10000 | 25.0 | 23.5 | 24.9 | 23.4 | 25.0 | 23.5 | 25.0 | 23.5 |
| 20000 | 35.6 | 33.4 | 35.4 | 33.2 | 35.4 | 33.3 | 35.4 | 33.2 |
| 50000 | 56.9 | 53.3 | 56.3 | 52.7 | 56.4 | 52.8 | 56.3 | 52.7 |

FIG. 9

| ATTENUATION = (l/L)x(axf^0.5+bxf^1+cxf^-0.5) | | | | | | | | |
|---|---|---|---|---|---|---|---|---|
| f | XLPE 1GHz | FEP 1GHz | XLPE 2.5GHz | FEP 2.5GHz | XLPE 5GHz | FEP 5GHz | XLPE 10GHz | FEP 10Ghz |
| 1 | 0.3 | 0.3 | 0.3 | 0.3 | 0.3 | 0.3 | 0.3 | 0.3 |
| 2 | 0.4 | 0.4 | 0.4 | 0.4 | 0.4 | 0.4 | 0.4 | 0.4 |
| 5 | 0.6 | 0.5 | 0.6 | 0.5 | 0.6 | 0.5 | 0.6 | 0.5 |
| 10 | 0.8 | 0.7 | 0.8 | 0.7 | 0.8 | 0.7 | 0.8 | 0.7 |
| 20 | 1.1 | 1.0 | 1.1 | 1.0 | 1.1 | 1.0 | 1.1 | 1.0 |
| 50 | 1.7 | 1.6 | 1.7 | 1.6 | 1.7 | 1.6 | 1.7 | 1.7 |
| 100 | 2.5 | 2.3 | 2.5 | 2.3 | 2.5 | 2.3 | 2.5 | 2.3 |
| 200 | 3.5 | 3.3 | 3.5 | 3.3 | 3.5 | 3.3 | 3.5 | 3.3 |
| 500 | 5.5 | 5.2 | 5.5 | 5.2 | 5.5 | 5.2 | 5.5 | 5.2 |
| 1000 | 7.8 | 7.4 | 7.8 | 7.4 | 7.8 | 7.4 | 7.8 | 7.4 |
| 2000 | 11.0 | 10.5 | 11.1 | 10.5 | 11.0 | 10.5 | 11.1 | 10.5 |
| 5000 | 17.5 | 16.7 | 17.6 | 16.7 | 17.5 | 16.6 | 17.6 | 16.6 |
| 10000 | 25.0 | 23.8 | 25.0 | 23.7 | 24.9 | 23.6 | 25.1 | 23.7 |
| 20000 | 35.6 | 34.0 | 35.7 | 33.9 | 35.6 | 33.7 | 35.7 | 33.7 |
| 50000 | 57.4 | 55.0 | 57.4 | 54.6 | 57.0 | 54.1 | 57.3 | 54.0 |

FIG. 11

| ATTENUATION = (l/L)x(axf^0.5+bxf^1+cxf^-0.5) | | |
|---|---|---|
| f | XLPE 10GHz | FEP 10Ghz |
| 1 | 0.3 | 0.3 |
| 2 | 0.4 | 0.4 |
| 5 | 0.6 | 0.5 |
| 10 | 0.8 | 0.7 |
| 20 | 1.1 | 1.0 |
| 50 | 1.7 | 1.6 |
| 100 | 2.4 | 2.3 |
| 200 | 3.4 | 3.3 |
| 500 | 5.5 | 5.2 |
| 1000 | **7.8** | **7.4** |
| 2000 | **11.1** | **10.5** |
| 5000 | **17.8** | **16.8** |
| 10000 | **25.6** | **24.0** |
| 20000 | 37.0 | 34.4 |
| 50000 | 61.1 | 55.9 |

FIG. 13

| ATTENUATION = (l/L)x(axf^0.5+bxf^1+cxf^-0.5) | | |
|---|---|---|
| f | XLPE 10GHz | FEP 10Ghz |
| 1 | 1.9 | 1.8 |
| 2 | 2.5 | 2.4 |
| 5 | 3.7 | 3.6 |
| 10 | 5.2 | 5.0 |
| 20 | 7.3 | 7.0 |
| 50 | 11.5 | 10.9 |
| 100 | 16.2 | 15.5 |
| 200 | 23.0 | 21.9 |
| 500 | 36.5 | 34.7 |
| 1000 | **51.9** | **49.3** |
| 2000 | **73.9** | **70.0** |
| 5000 | **118.6** | **111.7** |
| 10000 | **170.5** | **159.7** |
| 20000 | 246.7 | 229.2 |
| 50000 | 407.4 | 373.0 |

FIG. 15

FLUOROPOLYMER INSULATED COMMUNICATIONS CABLE

CROSS REFERENCE TO RELATED APPLICATIONS

This application is a continuation Application of U.S. application Ser. No. 17/967,269 filed Oct. 17, 2022, which is a continuation Application of U.S. application Ser. No. 17/306,158 filed May 3, 2021, now patent Ser. No. 11/515,060, which is a continuation Application of U.S. application Ser. No. 16/896,973 filed Jun. 9, 2020, now U.S. Pat. No. 11,024,443, which is a Continuation Application of U.S. application Ser. No. 16/415,186 filed May 17, 2019, now U.S. Pat. No. 10,734,133, which claims benefit of U.S. Provisional Application No. 62/738,569 filed Sep. 28, 2018, the contents of all of the above of which are incorporated herein by reference in their entirety.

FIELD OF THE DISCLOSURE

This disclosure relates to communications cables, and more specifically to communications cables for use in the motor vehicle industry.

BACKGROUND

Modern computer systems have been continuously increasing demands for data. These increasing data demands are becoming ever more present in computer systems used in motor vehicles. To transfer data in motor vehicle computer systems, the motor vehicle industry has typically relied on Controller Area Network (CAN) bus cables. Unfortunately, CAN bus cables are not capable of handling the data demands of the high bandwidth, low latency applications (e.g., autonomous driving) required by modern and upcoming motor vehicle computer systems.

As such, Ethernet, the universal networking standard for computer systems used in buildings, will become the new networking protocol for the motor vehicle industry. The Institute of Electrical and Electronics Engineers (IEEE) 802.3 Ethernet Group and the Society of Automotive Engineers (SAE) have developed or are developing standards for high-speed motor vehicle networks (including the physical layer). According to these standards, automotive Ethernet networks will be interconnected by high performance single twisted pair cables. Unfortunately, the materials used in previously known Ethernet cables are not capable of withstanding the environmental conditions within a motor vehicle while still allowing the Ethernet cable to provide sufficient data throughput so as to meet the data demands of modern and future motor vehicle computer systems.

Thus, what is needed are new types of communications cables (such as Ethernet cables) capable of being used in motor vehicles while still meeting the high data demands of modern and future motor vehicle computer systems.

SUMMARY

This disclosure relates generally to a communication cable for use in thermally demanding environments, such as the motor vehicle industry. In one embodiment, the cable includes a twisted pair of wires each insulated with a fluoropolymer insulator. Further embodiments may comprise a protective jacket around the insulated twisted pair, which protects the twisted pair of wires from environmental conditions and gives the cable structural integrity.

The twisted pair of wires are configured to carry a differential signal, such as a differential data signal and/or a differential power signal. To do this, the core of each wire is provided by a conductor to propagate the differential data and/or power signal(s). In each of the wires in, the twisted pair, wire insulation is provided that covers and surrounds the conductive core of the wire. In one embodiment, the wire insulation is formed from fluorinated ethylene propylene (FEP) and/or perfluoroalkoxy alkane (PFA). These materials are highly effective insulators and significantly reduce the effects of both internal and external electromagnetic interference while maintaining cable attenuation relatively low, even when carrying differential signals operating within a frequency range of 100 MHz to 10 GHz and within a temperature range of −40° C. to 150° C. In this manner, the cable is capable of handling the environmental conditions presented under the hood of a motor vehicle while meeting the high data demands of modern and future motor vehicle computer systems.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 3 is a row and column table that plots measurements of the dielectric constant of FEP and cross-linked LDPE at temperatures −40° C., 23° C., and 105° C. and at frequency points 1 GHz, 5 GHz, and 10 Hz and at the temperature of 150° C. at 2.5 GHz.

FIG. 6 is a row and column table that plots measurements of the dissipation factor of FEP and cross-linked LDPE at temperatures −40° C., 23° C., and 105° C. and at frequency points 1 GHz, 2.5 GHz, 5 GHz, and 10 GHz and at the temperature of 150° C. at 2.5 GHz.

FIG. 9 is a raw and column table that plots the calculations of single pair cable attenuation for FEP and cross-linked LDPE insulated cable based on the measurements of the dielectric constant and the dissipation factor at the temperature of −40° C. and with a cable length of 15 meters.

FIG. 11 is a row and column table that plots the calculations of single pair cable attenuation for FEP and cross-linked LDPE insulated cable based on the measurements of the dielectric constant and the dissipation factor at the temperature of 23° C. with a cable length of 15 meters.

FIG. 13 is a row and column table that plots the calculations of single pair cable attenuation for FEP and cross-linked LDPE insulated cable based on the measurements of the dielectric constant and the dissipation factor at the temperature of 105° C. with a cable length of 15 meters.

FIG. 15 is a row and column table that plots the calculations of single pair cable attenuation for FEP and cross-linked LDPE based on the measurements of the dielectric constant and the dissipation factor at the temperature of 105° C. with a cable length of 100 meters.

DETAILED DESCRIPTION

Figure 1:
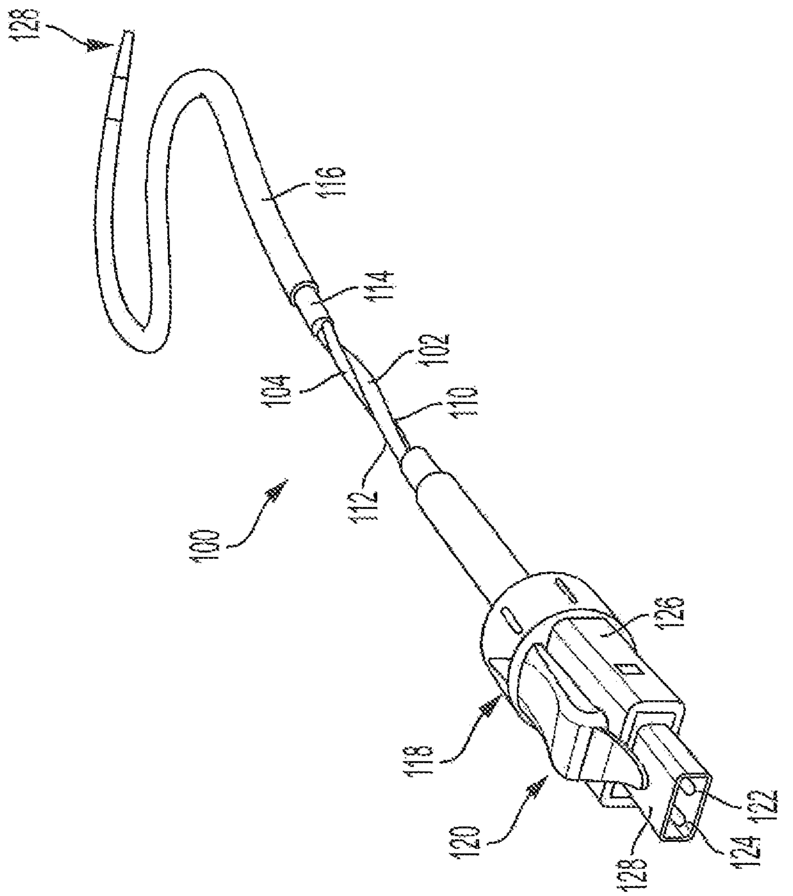
FIG. 1 illustrates a perspective view of an embodiment of a cable 100 in accordance with this disclosure.

The embodiments set forth below represent the necessary information to enable those skilled in the art to practice the disclosure and illustrate the best mode of practicing the disclosure. Upon reading the following description in light of the accompanying drawings those skilled in the art will understand the concepts of the disclosure and will recognize applications of these concepts not particularly addressed herein. It should be understood that these concepts and applications fall within the scope of the disclosure and the accompanying claims.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated. Numerical quantities in the claims are exact unless stated otherwise.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature of element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" on "directly coupled" to another feature element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer lists (e.g., "at least one of A, B, and C").

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

In some places reference is made to standard methods, such as but not limited to methods of measurement. It is to be understood that such standards are revised from time to time, and unless explicitly stated otherwise reference to such standard in this disclosure must be interpreted to refer to the most recent published standard as of the time of filing.

This disclosure describes embodiments of a communications cable, such an Ethernet cable. The cable is particularly useful in motor vehicle computer systems, which are exposed to high temperatures but have ever increasing data demands. One particular embodiment of the cable includes a single twisted pair of wires. The wire insulation of each of these wires is provided by highly insulative, low attenuation, and thermally resistant material such as FEP and/or PFA. The twisted pair of wires are configured to carry differential data and/or power signals. The use of FEP and/or PFA as a wire insulator allows for the cable to transmit differential signals within high frequency ranges (e.g., 100 MHz-10 GHz) while being capable of handling the more extreme thermal conditions presented by a motor vehicle. It should be noted that other embodiments of the cable may include several pairs, of wires to provide multiple paths for differential data and/or power signals. Further embodiments of the cable comprise more than one twisted pair. Specific embodiments of the cable comprise at least 1, 2, 3, or 4 twisted pairs. Still further specific embodiments of the cable comprise exactly 1, 2, 3, or 4 twisted pairs. These pairs of wires may be inserted within a cable jacket, which provides the Ethernet cable with its structural integrity. Furthermore, in some implementations, the cable may lie shielded to help protect the cable from electromagnetic interference.

Figure 2:
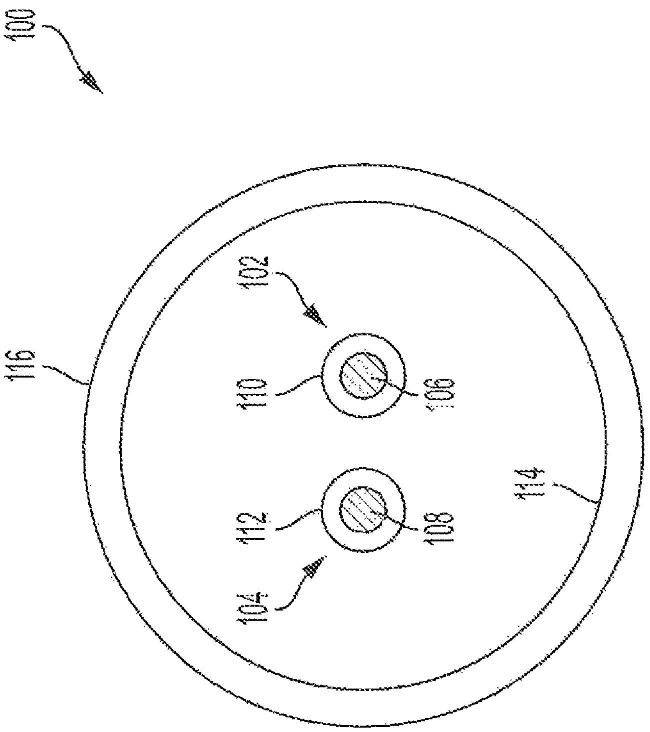
FIG. 2 illustrates a cross sectional view of the embodiment of a cable 100 shown in FIG. 1.

FIG. 1 illustrates a perspective view of an embodiment of a cable 100 in accordance with this disclosure while FIG. 2 illustrates a cross sectional view of the embodiment of a cable 100 shown in FIG. 1. The cable 100 includes a pair of wires 102, 104 that are Misted together so as to form a twisted pair of wires 102, 104. The wire 102 includes a conductor 106 (See FIG. 2) while the wire 104 includes a conductor 108 (See FIG. 2) that are each formed from a conductive material. The conductive material that forms the conductors 108, 108 may be any conductive material, including elemental metals, alloys, and the like. In one embodiment, the conductors 106, 108 in the wires 102, 104 are each formed from copper. The pair of conductors 106, 108 may be used in some implementations to propagate a differential signal, such that the conductors 106, 108 carry complementary signals that are approximately 180 degrees apart in phase. Thus, the pair of wires 102, 104 are twisted to help cancel electromagnetic interference between the wires 102, 104 and maintain the pair of conductors 106, 108 balanced. In one implementation, the pair of wires 102, 104 will be used to handle both data signaling and power transmission. For example, the pair of wires 102, 104 may be utilized to deliver around 50 Watts of power to sensors and active communications devices.

As shown in FIG. 1 and FIG. 2, each of the wires 102, 104 also includes wire insulation 110, 112. The wire insulation 110 of the wire 102 surrounds and covers the conductor 106 while the wire insulation 112 of the wire 104 surrounds and covers the conductor 108. The wire insulation 110 and the wire insulation 112 are formed from an insulation material that has a low dielectric constant has a low permittivity and thus resists the concentration of electromagnetic lines of flux in the presence of high charges and currents. This allows the pair of wires 102, 104 to propagate high frequency signals. In one implementation, the cable 100 is a Category 6A Ethernet cable, which requires that the cable 100 be capable of carrying signals with an operating frequency between 10 MHz and 500 MHz and a system throughput up to 10 Gigabits per second (Gbps), while minimizing external noise influences and internal crosstalk sources, such as near end crosstalk (NEXT) and far end crosstalk (FEXT). Examples of suitable forms of Category 6A cable 100 include unshielded twisted pair cable (UTP), segmented shield twisted pair (SSTP), and shielded twisted pair (STP). One suitable form of STP comprises a shield having polyethylene terephthalate (PET) on one side and aluminum on the other, and a drain wire. One suitable form of SSTP comprises a shield having polyethylene terephthalate (PET) on one side and aluminum on the other, wherein the aluminum is cut at regular intervals while the PET is intact along the length of the shield, obviating the need for a drain wire.

In some embodiments, the insulation material that forms the wire insulation 110 and the wire insulation 112 has a dielectric constant between approximately 1.2 to approximately 2.1 at temperatures experienced under the hood of modern automotive engines. Typically these temperatures vary from −40° C. to 200° C. In another embodiment, the insulation material that forms the wire insulation 110 and the wire insulation 112 has a dielectric constant between approximately 1.5 to approximately 2.1 at temperatures experienced under the hood of modern automotive engines. In still another embodiment, the insulation material that forms the wire insulation 110 and the wire insulation 112 has a dielectric constant between approximately 1.7 to approximately 2.1 at temperatures experienced under the hood of modern automotive engines. Examples of insulation materials that might meet these criteria are fluoropolymers such as FEP and/or PFA.

Fluoropolymers have several advantages, such as one or more of the following: good performance over a wide range of temperatures, high melting point, high resistance to solvents, high resistance to acids, high resistance to bases, water resistance, oil resistance, low friction, and high stability. One example of a suitable fluoropolymer is a PFA. PFAs are melt-processible copolymers of tetrafluoroethylene ($C_2F_4$) and perfluoroethers ($C_2F_3ORf$, wherein Rf is a perfluorinated group). A structure of a suitable PFA might be $—(CF_2CF_2)_n(CF_2CFO(CF_3))_m—$.

Another example of a suitable fluoropolymer is FEP (CAS Registry Number 25067-11-2). FEP is a melt-processible copolymer of hexafluoropropylene and tetrafluoroethylene. Unlike PFA, each carbon in FEP is saturated with fluorine atoms. The TFE subunit has a general formula of $—(CF_2CF_2)—$ and the hexafluoropropylene subunit has a general formula of $—(CF_2CF(CF_3))—$.

The above-mentioned fluoropolymers may be foamed or it solid form. In cine embodiment, the fluoropolymer has a foamed structure. In this aspect, the fluoropolymer may further include an agent to facilitate foaming. For instance, the fluoropolymer may include a nucleating agent. Suitable agents include, but are not limited to, boron nitride; inorganic salts such as calcium tetraborate, sodium tetraborate, potassium tetraborate, calcium carbonate, zinc tetraborate, and barium nitrate; talc; and metal oxides such as magnesium oxide, aluminum oxide, and silicon dioxide. In one embodiment, the fluoropolymer includes boron nitride.

The foamed fluoropolymers described herein are suitable for use in the insulation material that forms the wire insulation 110 and the wire insulation 112. In one embodiment, when the insulation material is comprised of the foamed fluoropolymer, the insulation material has a dielectric constant between approximately 1.2 and approximately 1.7. In another embodiment, when the insulation material is comprised of the foamed fluoropolymer, the insulation material has a dielectric constant between approximately 1.4 and approximately 1.6. In still, another embodiment, when the insulation material is comprised of the foamed fluoropolymer, the insulation material has a dielectric constant between approximately 1.4 and approximately 1.5.

Tables 1 and 2 below show the dielectric constants of various foamed fluoropolymers.

TABLE 1

| NP110PBS (Foamed FEP) (Daikin America, Inc.) | |
|---|---|
| Capacitance of Coax | |
| Final Dielectric Constant | 1.46 |
| Diameter to inner shield | 0.14 inch |
| Diameter of conductor | 0.02 inch |
| Strand factor* | 1 [—] |
| Capacitance (pf/ft) | 12.70 |
| For Void Rate to Dielectric Constant and VP | |
| Void Rate | 54.00% |
| Dielectric Constant of Base | 2 |
| Dielectric Constant | 1.46 |

TABLE 2

| Teflon ™ FFR550 (The Chemours Company) | |
|---|---|
| Capacitance of Coax | |
| Final Dielectric Constant | 1.48 |
| Diameter to inner shield | 0.135 inch |
| Diameter of conductor | 0.02 inch |
| Strand factor* | 1[—] |
| Capacitance (pf/ft) | 13.12 |
| For Void Rate to Dielectric Constant and VP | |
| Void Rate | 52.00% |
| Dielectric Constant of Base | 2 |
| Dielectric Constant | 1.48 |

The insulator of each conductive wire may be at least 50% w/w of the fluoropolymer. In further embodiments, each conductive wire may be at least 55, 60, 65, 70, 75, 80, 85, 90, 95, 96, 97, 98, 99, or 100% of the fluoropolymer.

The insulation materials may also include additives, modifiers, or reinforcements. For example, the insulation materials may be pigmented or include a colorant for identification purposes.

It should be noted that other embodiments of the cable 100 may be provided so as to be an Ethernet cable of a different category, such as Category 5e, Category 6, Category 7, Category 7A, and Category 8. Alternative embodiments of the cable *100 may be provided as other types of Ethernet cables including 10BASE-T1 or 100BASET1 cables. Some of the Ethernet standards that different examples of the cable 100 may comply with include IEEE 802.3cg, IEEE 802.3bw, IEEE 802.3bp, IEEE 802.3ch, IEEE 802.3bu Ethernet standards. Furthermore, some of the cable standards include SAE J3117/1, SAE J3117/2, and SAE J3117/3.

The embodiment of the cable 100 shown in FIG. 1 and FIG. 2 includes a shield 114 and a cable jacket 116 that surround the wires 102, 104 that carry the differential data and/or power signals along the length of the cable 100. In this example, the shield 114 is provided between the wires 102, 104 and the cable jacket 116. The shield 114 is configured to reflect EMI and/or safely conduct EMI to ground. In either case, the shield 114 helps prevent EMI from effecting the conductors 106, 108 in the wires 102, 104. Thus, even if some EMI passes through the shield 114, it is so highly attenuated and does not significantly interfere with the data and/or power signals being transmitted along the conductors 106, 108 of the wires 102, 104.

In this example, the shield 114 is provided as a braid, which may be formed as a woven mesh of a metal such as copper. The shield 114 can thus provide a highly conductive path to ground. This embodiment of the cable 100 is an example of an unshielded twisted pair cable (DTP). In some implementations, the cable 100 is up to 40 meters in length and is particularly useful for use in large trucks. In alternative examples, the shield 114 may be provided as a foil shield, which may be formed by a thin layer of a metal such as aluminum. The foil shield may be attached to a carrier (which may be formed from a material such as polyester) to add strength and ruggedness. In still other examples, the cable 100 may include multiple concentric shields, which is particularly useful in very noisy environments. In still other examples, the cable 100 may be unshielded so that there is no shield 114 between the jacket 116 and the wires 102, 104. This would be an example of an unshielded twisted pair cable (UTP). In some implementations, the UTP may be up to 15 meters in length and be particularly useful in standard consumer automobiles.

The embodiment of the cable 100 shown in FIG. 1 and FIG. 2 also includes the jacket 116, which forms the outermost layer of a cable 100 and is thus whose outer surface is exposed externally to the external environment. Some embodiments of the jacket 116 surround one or both of the shield 114 and the wires 102, 104. In this manner, the jacket 116 is configured to protect the shield, 114, the insulation 110, 112, and the conductors 106, 108 from EMI, external physical forces, heat, and chemical deterioration. The jacket 116 may be formed from any suitable material, such as polyvinyl chloride (PVC), polyurethane (PUR), chlorinated polyethylene (CPE), neoprene, ethylene propylene rubber (EPR), FEP, PFA, or ethylene tetrafluoroethylene (ETFE). In some alternative examples, fillers, plasticizers, activators, and inhibitors may be added to the jacket 116 to enhance a particular 30 physical, electrical, or chemical characteristic of the jacket 116.

The embodiment of the cable 100 shown in FIG. 1 includes a connector 118 that is connected at one end 120 of the cable 100. More specifically, the connector 118 includes a pair of conductive members 122, 124, wherein a corresponding end (not explicitly shown, of the conductor 106 of the wire 102 is connected to the conductive member 122 and a corresponding end (not explicitly shown) of the conductor 108 of the wire 104 is connected to the conductive member 124. The conductive members 122, 124 may provide a differential input/output port of the cable 100 so that the differential data and/or power signals propagated through the wires 102, 104 can be input and/or output into and/or out of the cable 100. The connector 118 also includes a connector housing 126 that house the pair of conductive members 122, 124. The shield 114 and the jacket 116 are terminated and attached internally within the housing 126. The housing 126 further includes an insertable portion 128 that surrounds the conductive members 122, 124 and may be inserted into an antipodal connector (not explicitly shown) so that data and/or power differential signals may be input into and/or output out of the cable 100.

It should be noted that in this example, the connector 118 is male differential connector since the pair of conductive members 122, 124 provide a male connection to input or output the data and/or power differential signals. In alternative embodiments, the connector 118 may be a female connector and thus include a pair of conductive channels configured to receive the male differential connector n addition, in this embodiment of the cable 100, another connector, like the connector 118, is not provided at the other end 128 of the cable 100. Instead, a connection may be provided directly to the conductors 106, 108 at this end 128 of the cable 100. However, in alternative embodiments, another connector, like the connector 118, is connected at this end 128 of the cable 100.

As explained in further detail below FIG. 3-FIG. 8B illustrate the electrical advantages of using FEP as the insulation 110, 112 versus typical insulation materials used in the automotive industry such as cross-linked polyethylene or polypropylene.

To determine the electrical measurements, a resonant cavity perturbation technique was used. More specifically, the resonant cavity perturbation technique described as the ASTM D2520 Method B was performed in a frequency range between 1 GHz-10 GHz. A resonant cavity 200 is provided and connected to an oscilloscope 202. To determine the electrical characteristics of the material (in this case, FEP and cross-linked LDPE), the materials are placed in the resonant cavity 200. When the materials are placed in the resonant cavity 200, the resonant cavity 200 is perturbed by a change in the permittivity or permeability caused by the material. The change in the permittivity or permeability is detected by measuring the frequency response of the resonant cavity 200 with and without the material. The change in the frequency response (e.g., change in the resonant frequency) of the resonant cavity 200 due to the material can then be determined to calculate the electrical characteristics of the material.

In general, the Dielectric Constant and Dissipation Factor of FEP and cross-linked LDPE were measured at temperatures −40° C., 23° C., and 105° C. and at frequency points 1 GHz, 2.5 GHz, 5 GHz, and 10 GHz. The Dielectric Constant and Dissipation Factor of FEP and cross-linked LDPE were measured at 150° C. at a frequency of 2.5 GHz, since these are likely to be the most extreme conditions experienced while under the hood of a motor vehicle. An average of three samples were tested at each frequency and the test values were taken after a 15-minute material stabilization period unless otherwise noted.

Figure 4:
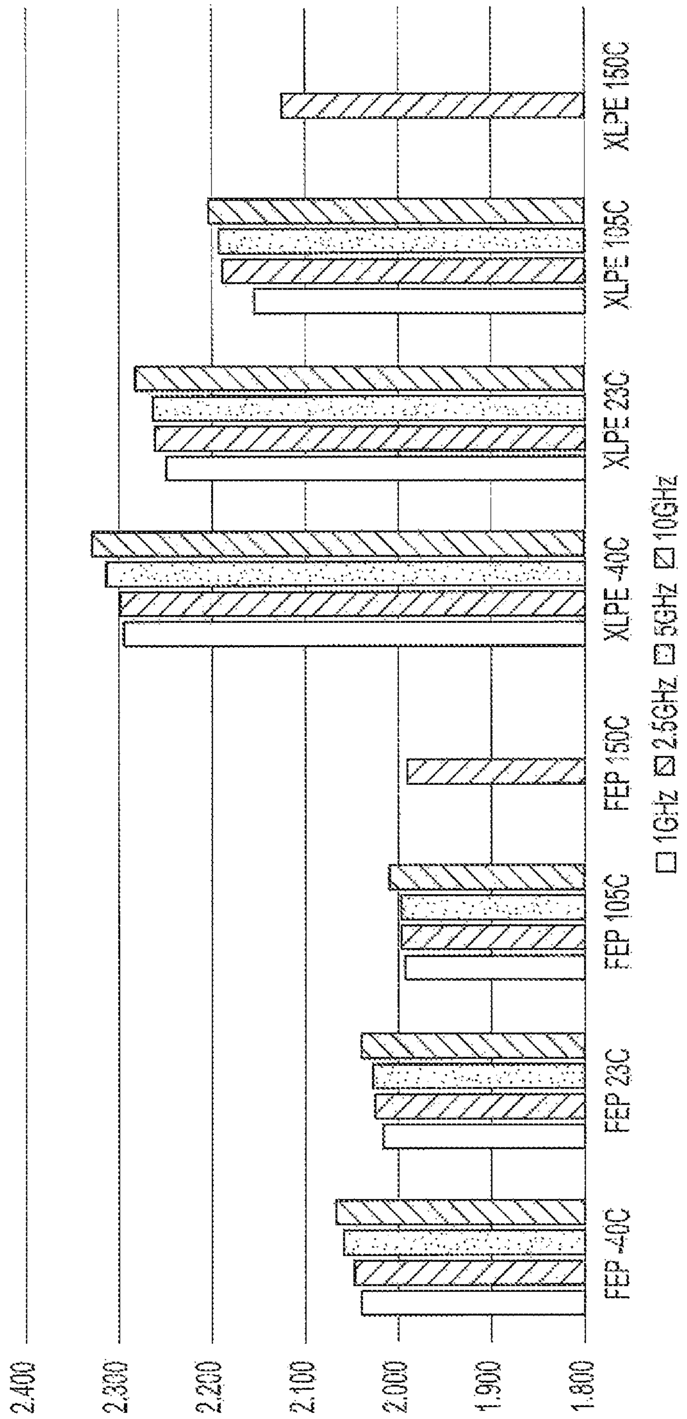
FIG. 4 is a bar chart that plots the same measurements shown in FIG. 3.

FIG. 3 and FIG. 4 are charts that plot measurements of the dielectric constant of FEP and cross-linked LDPE at temperatures −40° C., 23° C., and 105° C. and at frequency points 1 GHz, 2.5 GHz, 5 GHz, and 10 GHz and at the temperature of 150° C. at 2.5 GHz. FIG. 3 is a textual row and column table while FIG. 4 is a bar chart that displays the measurements of the dielectric constant. The dielectric constant is a ratio of the absolute permittivity of a material relative to the permittivity of a vacuum. Thus, the lower the dielectric constant the higher the capability of the material to attenuate an electric field. As shown by FIG. 3 and FIG. 4, the dielectric constant of FEP is consistently lower than cross-linked LDPE (cross-linked LDPE referred to herein as "XLPE") at all frequencies and temperatures. Furthermore, there is much less variation in the dielectric constant of FEP across all frequencies and temperatures when compared to the dielectric constant of cross-linked LDPE.

Figure 5:
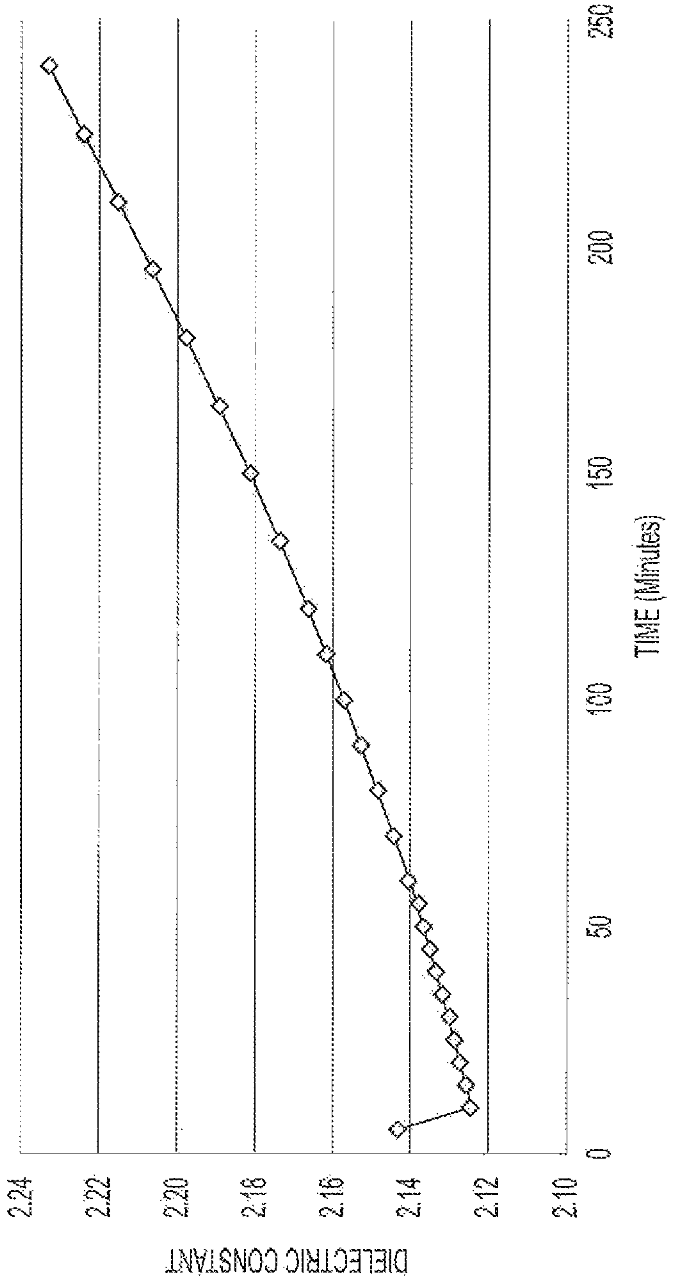
FIG. 5 illustrates the variation of the dielectric constant of cross-linked LDPE over time, when measured at the frequency point of 2.5 GHz and at the temperature of 150° C.

Another advantage of FEP is that the dielectric constant of FEP stays relatively consistent over time even at 150° C. While the dielectric constant of cross-linked LDPE stays relatively consistent at 105° C. over time, the dielectric constant of cross-linked LDPE does not stay consistent at 150° C. over time, as shown in FIG. 5. More specifically, FIG. 5 illustrates the variation of the dielectric constant of cross-linked LDPE over time, when measured at the frequency point of 2.5 GHz and at the temperature of 150° C. As shown by FIG. 5, after initially dipping from approximately 2.14 to 2.12, the dielectric constant of cross-linked LDPE increases to nearly 2.24 over span of just over 4 hours.

Figure 7:
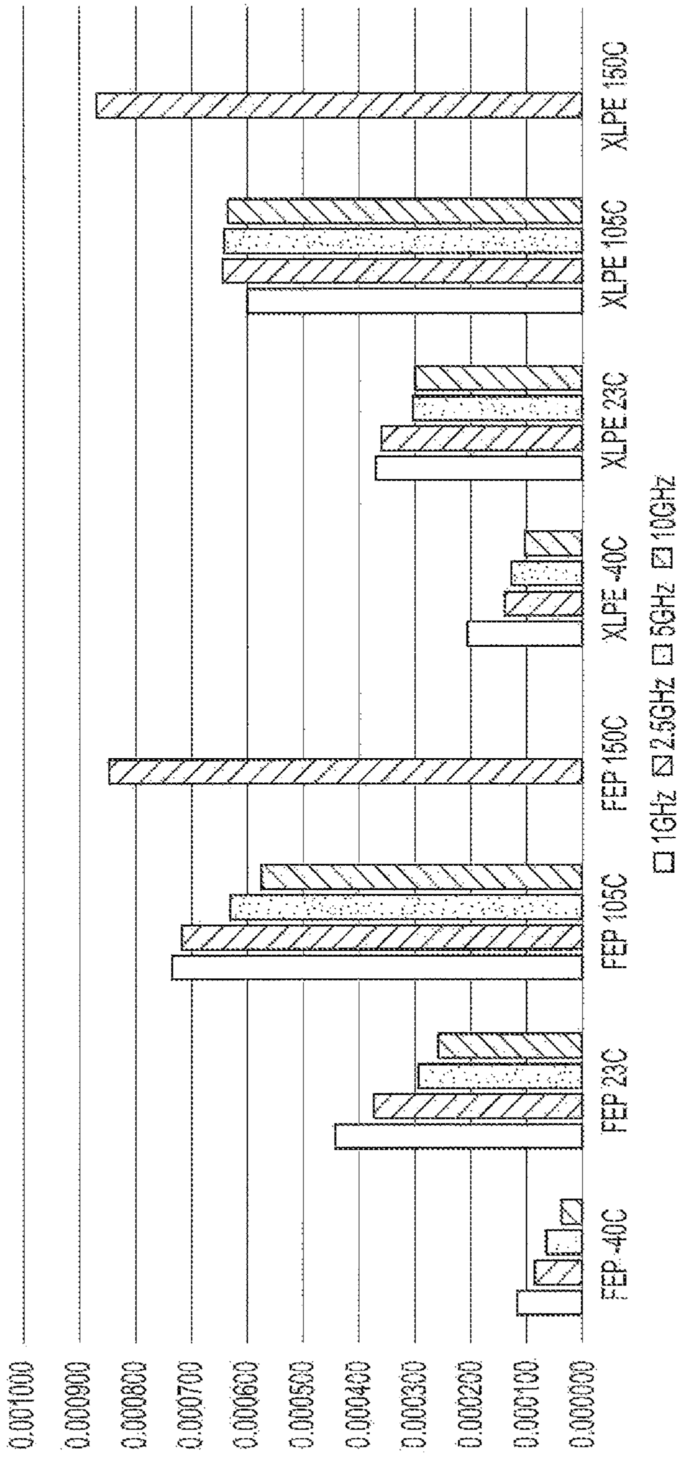
FIG. 7 is a bar chart that plots the same measurements shown in FIG. 6.

FIG. 6 and FIG. 7 are charts that plot measurements of the dissipation factor of FEP and cross-linked LDPE at temperatures 23° C., −40° C., and 105° C. and at frequency points 1 GHz, 2.5 GHz, 5 GHz, and 10 GHz and at the temperature of 150° C. at 2.5 GHz. FIG. 6 is a textual row and column table while FIG. 7 is a bar chart that displays the measurements of the dissipation factor. The dissipation factor of a material is the reciprocal of its quality factor. The quality factor is equal to the ratio of the absolute value of susceptance to conductance. As such, the dissipation factor is a measure of the rate of loss of energy for a mode of oscillation in a material. Thus, the lower the dissipation factor the higher the capability of the material to dissipate energy oscillations. As shown by FIG. 6 and FIG. 7, the dissipation factor of FEP is comparable to that of cross-linked LDPE at all frequencies and temperatures. In fact, the dissipation factors of FEP are generally lower than for cross-linked LDPE across the frequencies and temperatures. This indicates superior performance by FEP when compared to cross-linked LDPE (for example, less signal or power is lost along the length of the wire).

Figure 8B:
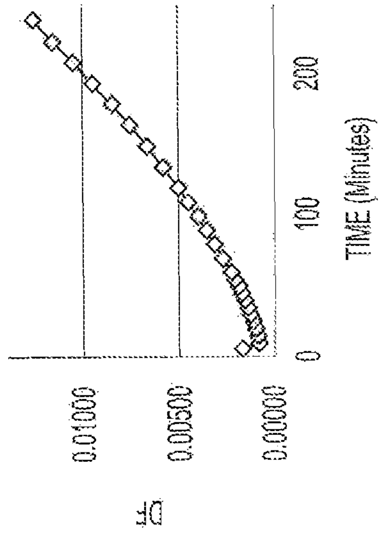
FIG. 8B illustrates the variation of the dissipation factor of cross-linked LDPE over time, when measured at the frequency point of 2.5 GHz and at the temperature of 150° C.
Figure 8A:
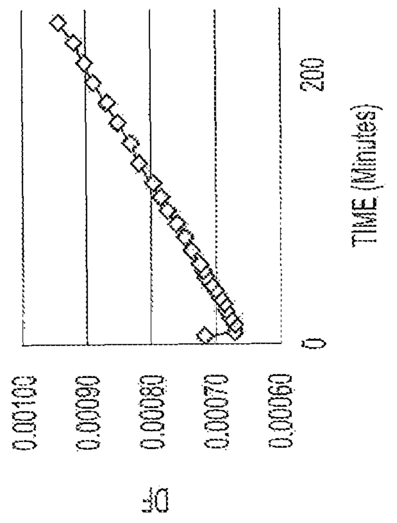
FIG. 8A illustrates the variation of the dissipation factor of cross-linked LDPE over time, when measured at the frequency point of 10 GHz and at the temperature of 105° C.

However, an advantage of FEP over cross-linked LDPE is that the dissipation factor of FEP stays relatively consistent over time unlike the dissipation factor of cross-linked LDPE. This is illustrated by FIG. 8A and FIG. 8B. More specifically, FIG. 8A illustrates the variation of the dissipation factor of cross-linked LDPE over time, when measured at the frequency point of 10 GHz and at the temperature of 105° C. As shown by FIG. 8A, after initially dipping just under below 0.00070, the dissipation factor increases to over 0.00090 over a span of nearly 4 hours. FIG. 8B illustrates the variation of the dissipation factor of cross-linked LDPE over time, when measured at the frequency point of 2.5 GHz and at the temperature of 150° C. As shown by FIG. 8B, after initially dipping to just above zero, the dissipation factor increases to over 0.01000 over a span of nearly 4 hours. An experiment has also been performed at 23° C. where the dissipation factor of cross-linked LDPE was 0.000337 prior to the experiment and 0.000505 after the experiment. This is an over 50% increase in the dissipation factor.

As can be seen from the test data described above with respect to FIG. 3-FIG. 8B, FEP is a stable material through 150° C. when compared with cross-linked LDPE.

Cross-linked LDPE is simply one example of a wire insulation material commonly used in the automotive industry. While cross-linked LDPE's −40° C. and 23° C. dielectric properties are good, cross-linked LDPE is not thermally and electrically stable enough to be used at 105° C. or higher as the insulator of wiring within Ethernet cables for automotive applications. Structural analysis revealed that the plaques of LDPE were cross-linked but it is not known at this time if this material was cross-linked to the level one would find on wires for Ethernet cable. Further experimentation may resolve this question.

Given the experimental information for the dielectric constant and the dissipation factor, the single pair cable attenuation of the wires 102, 104 can be calculated with the formula:

$$A=l/L(af^{0.5}+bf+cf^{0.5})$$

where A is the attenuation (decibel), L is the length of the cable 100 (meters), f is the frequency (multiples of Hertz, i.e., MHz or GHz), and the par meters a, b, and c are derivable from the dielectric constant and the dissipation factor.

More specifically, "l/L" is a length correction factor or a linear adjustment for a cable length different from 100 m. For instance, if a cable is 15 m, the attenuation value will be 15/100 or 15 percent of the 100 m value. Parameter "a" includes the Dielectric Constant (DC) of the insulation material plus an adjustment factor from the 2.75 standard (derived from the channel requirements for multi-gigabit Ethernet (IEEE802.3ch)), and copper factors including AWG, conductivity, and stranding factor. For purposes of the present disclosure, 24 AWG bare copper is used for the calculations. Parameter "b" includes the Dissipation Factor (DF) or Loss Tangent (tan δ) of the insulation material plus an adjustment factor from the 0.005 standard. Parameter "c" influences attenuation at low frequencies. This term is a calculation adjustment that takes into account how parameters, such as skin effect, inductance, and roundness of the conductor, impact attenuation calculations. In some embodiments, because attenuation is evaluated at high frequencies (up to 10 GHz), this term will have a minimal effect.

Figure 10:
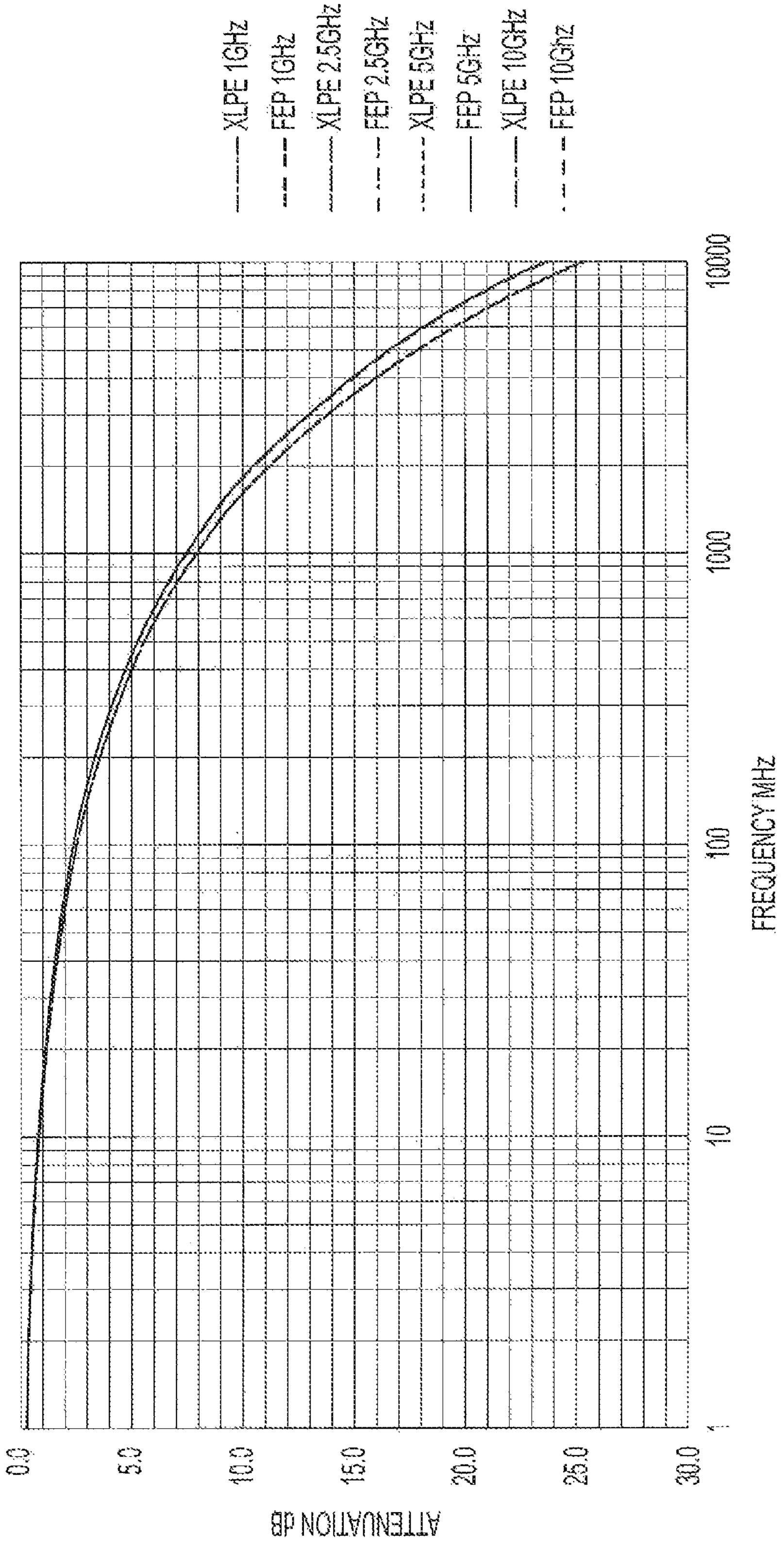
FIG. 10 is a line chart of single pa cable attenuation based on the same calculations in FIG. 9.

FIG. 9 and FIG. 10 are charts that plot be calculations of ingle pair cable attenuation for cables insulated with FEP and cross-linked LDPE based on the measurements of the dielectric constant and the dissipation factor at the temperature of −40° C. and with a cable length of 15 meters. FIG. 9 is a textual row and column table while FIG. 10 is a line chart that displays the calculation of cable attenuation. A band of cable attenuation values are highlighted in FIG. 9 between 1 GHz and 10 GHz, where the cable attenuation values for the FEP insulated cable are highlighted in red. The calculations show that the single pair cable attenuation of cable insulated with FEP is 0.4-1.5 dB better than the cable attenuation values of cross-linked LDPE insulated cable between 1 GHz and 10 GHz. The electrical performance advantage of FEP insulated cable at the temperature of −40° C. is due to the lower dielectric constant and dissipation factor of FEP at the temperature of −40° C.

Figure 12:
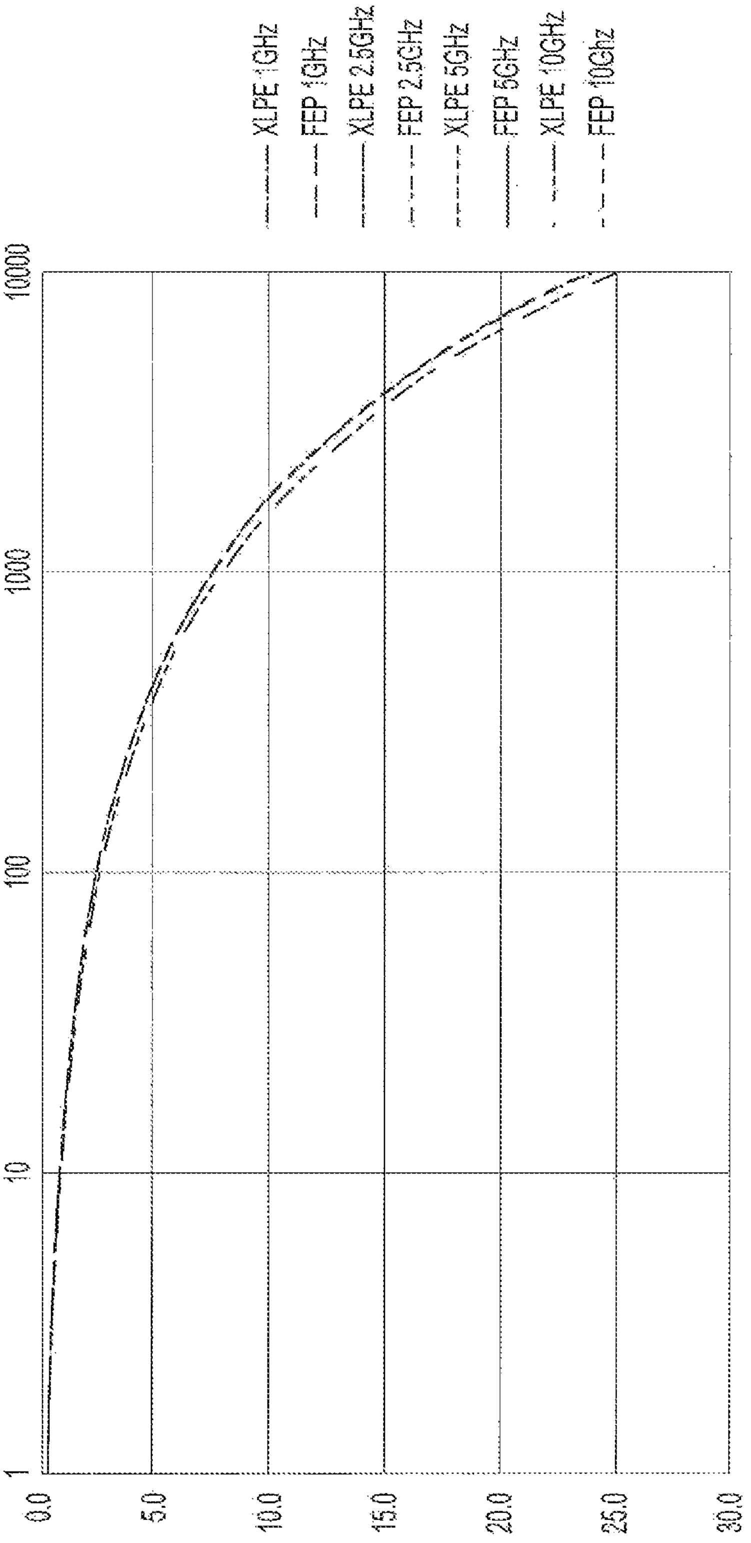
FIG. 12 is a line chart of single pair cable attenuation based on the same calculations in FIG. 11.

FIG. 11 and FIG. 12 are charts that plot the calculations of single pair cable attenuation for cable insulated with FEP and cross-linked LDPE based on the measurements of the dielectric constant and the dissipation factor at the temperature of 23° C. with a cable length of 15 meters. FIG. 11 is a textual row and column table while FIG. 12 is a line chart that displays the calculation of cable attenuation. A band of cable attenuation values are highlighted in FIG. 11 between 1 GHz and 10 GHz, where the cable attenuation values for FEP insulated cable are highlighted in red. The calculations show that the single pair cable attenuation of cable insulated with FEP is 0.4-1.5 dB better than the cable attenuation values of cross-linked LDPE insulated cable between 1 GHz and 10 GHz. The electrical performance advantage of FEP insulated cable at the temperature of 23° C. is due to the lower dielectric constant and dissipation factor of FEP at the temperature of 23° C.

Figure 14:
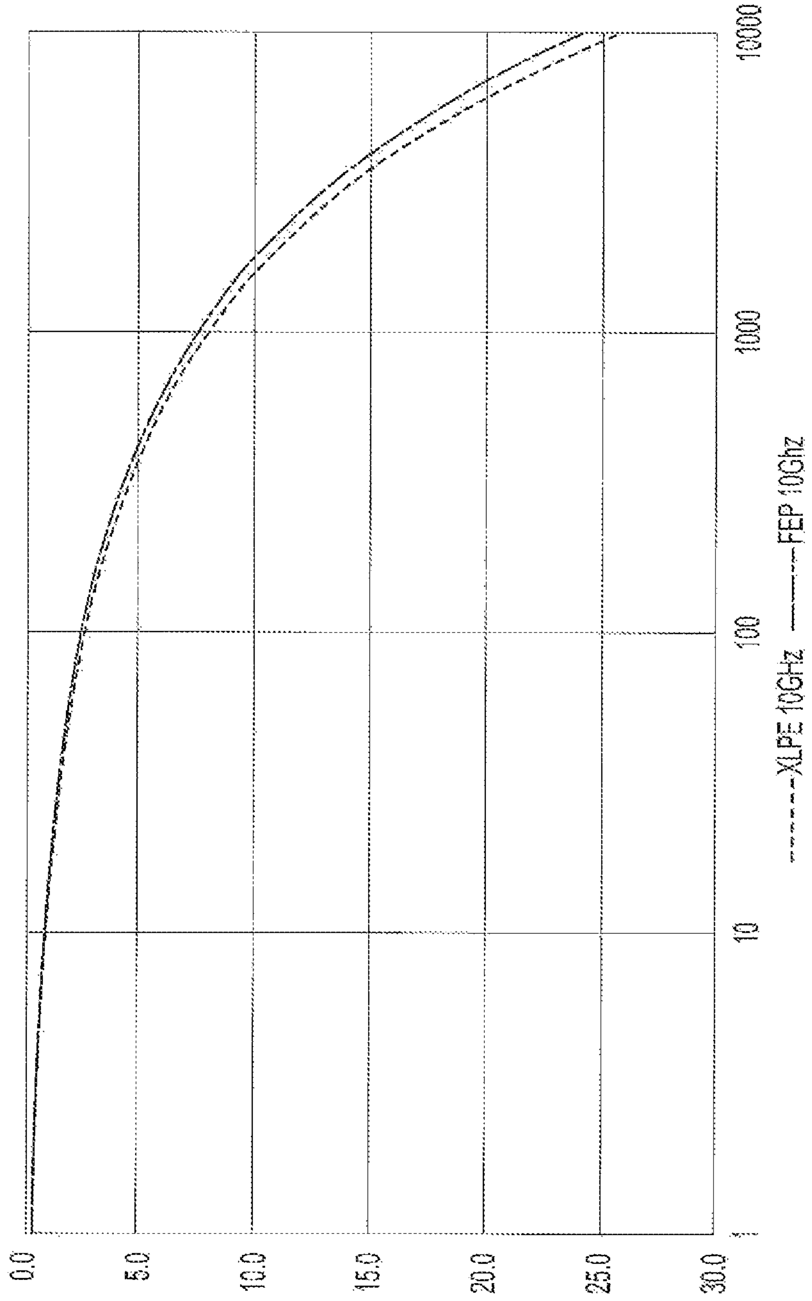
FIG. 14 is a line chart of single pair cable attenuation based on the same calculations in FIG. 13.

FIG. 13 and FIG. 14 are charts that plot the calculations of single pair cable attenuation for FEP and cross-linked LDPE insulated cables based on the measurements of the dielectric constant and the dissipation factor at the temperature of 105° C. with a cable length of 15 meters. FIG. 13 is a textual row and column table while FIG. 14 is a line chart that displays the calculation of cable attenuation. A band of cable attenuation values are highlighted in FIG. 13 between 1 GHz and 10 GHz, where the cable attenuation values for FEP and cross-linked LDPE are highlighted in red. At the temperature of 105° C., the calculations become more challenging because the dissipation factor of the cross-linked LDPE does not stabilize. Thus, the measured value of the dissipation factor after a four-hour time period having elapsed was used since this corresponded with the worst-case scenario. The dielectric constant of cross-linked FEP on the other hand is stable so there is no issue with it.

The dielectric constant and dissipation factor measured at 10 GHz for both FEP and cross-linked LDPE were inserted into the above recited attenuation equation. The single pair cable attenuation advantage for cable insulated with FEP over cross-linked LDPE ranged from 0.4-1.6 dB in the 1 GHz-10 GHz band, which is similar to the performance advantage observed for PEP and cross-linked LDPE at −40° C. and 23° C.

Figure 16:
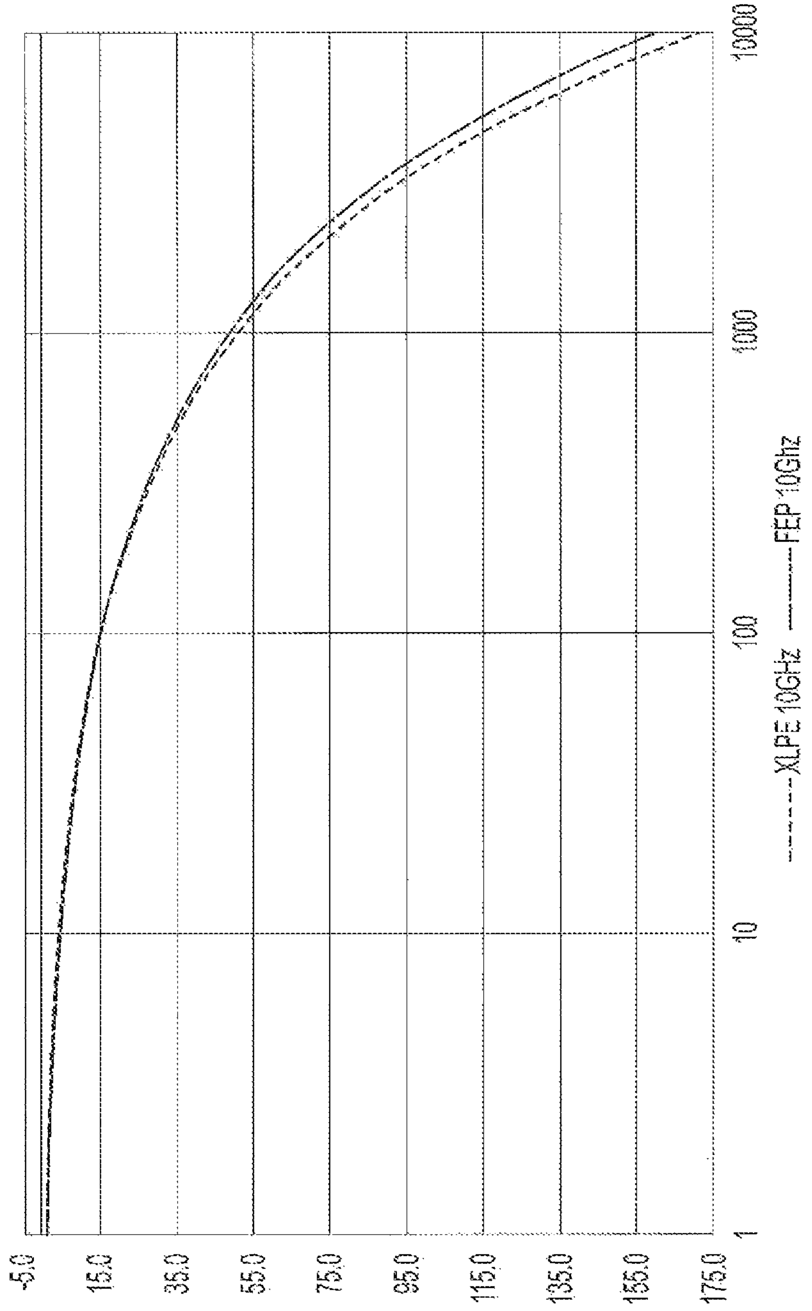
FIG. 16 is a line chart of attenuation based on the same calculations in FIG. 15.

FIG. 15 and FIG. 16 are charts that plot the calculations of cable attenuation for cables insulated with FEP and cross-linked LDPE based on the measurements of the dielectric constant and the dissipation factor at the temperature of 105° C. with a cable length of 100 meters. FIG. 15 is a textual row and column table wile FIG. 16 is a line chart that displays the calculation of attenuation. A band of cable attenuation values are highlighted in FIG. 15 between 1 GHz and 10 GHz, where the single pair cable attenuation values for FEP and cross-linked LDPE are highlighted in red. The results of shown in FIG. 15 and FIG. 16 can thereby be compared with the results in FIG. 13 and FIG. 14 to demonstrate the effect of cable length. More specifically, by comparing the calculations in FIG. 13 and FIG. 14 to the calculations in FIG. 15 and FIG. 16, it can be seen that, the attenuation advantage of cable insulated with FEP over cable insulated with cross-linked LDPE grows to 2.6 dB at 1 GHz and to 10.8 dB at 10 HZ at the temperature of 105° C. Thus, providing the insulation 106, 108 for the wires 102, 104 of the cable 100 provides a significant and meaningful cable attenuation advantage to the motor vehicle industry over previously known insulation materials, such as cross-linked LDPE. In particular, FIG. 9-FIG. 16 demonstrate that, the dielectric properties of FEP make a significant difference in the single pair cable attenuation characteristics of the cable 100 when FEP is used to provide the insulation 112, 114 of the wires 102, 104.

Those skilled in the art will recognize improvements and modification to the preferred embodiments of the present disclosure. All such improvements and modifications are considered within the scope of the concepts disclosed herein and the claims that follow. It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure, Additionally, the disclosure shows and describes only certain embodiments of the processes machines, manufactures, compositions of matter, and other teachings disclosed, but, as mentioned above, it is to be understood that the teachings of the present disclosure are capable, of use in various other combinations, modifications, and environments and are capable of changes or, modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 117 or otherwise to provide organizational queues. These headings shall not limit or characterize the invention(s) set forth herein.

The following is claimed:

1. A motor vehicle communications cable comprising: one twisted pair of conductors, and an outer cable jacket surrounding the twisted pair of conductors, said twisted pair of conductors comprising two conductors, each conductor electrically insulated by an insulating layer; wherein the insulating layers contain at least 95% w/w of fluorinated ethylene propylene (FEP) foam;

wherein the insulating layers have substantially smooth interior surfaces and are in contact with the conductors along an outer circumference, and wherein the outer cable jacket surrounds the twisted pair along an outer circumference;

wherein the insulating layers have a dielectric constant from about 1.2 to about 1.7 over a temperature range of −40° C. to 150° C. and over a frequency range of 100 MHz −10 GHz when measured by the resonant cavity perturbation technique of ASTM D2520 Method B; and wherein the twisted pair is configured to deliver differential power signals and differential data signals power to sensors.

2. The motor vehicle communications cable of claim 1, wherein the insulating layers further comprise a foaming agent.

3. The motor vehicle communications cable of claim 1, wherein the insulating layers further comprise boron nitride.

4. The motor vehicle communications cable of claim 1, wherein the dielectric constant of the insulating layers is between about 1.4 and about 1.6.

5. The motor vehicle communications cable of claim 1, wherein the dielectric constant of the insulating layers remains between about 1.2 to about 1.7 over time.

6. The motor vehicle communications cable of claim 1, wherein the cable is unshielded.

7. The motor vehicle communications cable of claim 1, further comprising a conductive shield between the twisted pair and the outer cable jacket, wherein the conductive shield is configured to reflect electromagnetic interference.

8. A motor vehicle communications cable comprising: exactly one twisted pair of conductors, and an outer cable jacket surrounding the twisted pair of conductors, said twisted pair of conductors comprising a first conductor insulated by a first insulating layer, and a second conductor insulated by a second insulating layer; wherein the first and second insulating layers contain at least 95% w/w of fluorinated ethylene propylene (FEP);

wherein the first and second insulating layers have a substantially smooth interior surface and are in contact with the first and second conductors respectively along an outer circumference, and wherein the outer cable jacket surrounds the pair of conductors along an outer circumference of the pair of conductors;

wherein the first and second insulating layers have a dielectric constant from about 1.7 to about 2.1 over a temperature range of −40° C. to 150° C. and over a frequency range of 100 MHz-10 GHz when measured by the resonant cavity perturbation technique of ASTM D2520 Method B;

wherein the first and second insulating layers have a dissipation factor from about 0.00004 to about 0.0006 over a temperature range of −40° C. to 105° C. and at a frequency of about 10 GHz; and wherein the twisted pair is configured to deliver differential power signals and differential data signals power to sensors.

9. The motor vehicle communications cable of claim 8, wherein the insulating layers further comprise a nucleating agent.

10. The motor vehicle communications cable of claim 8, wherein the insulating layers further comprise boron nitride.

11. The motor vehicle communications cable of claim 8, wherein the dielectric constant of the insulating layers remains between about 1.7 to about 2.1 over time.

12. The motor vehicle communications cable of claim 8, comprising an inner layer of conductive shielding surrounding the twisted pair of conductors.

13. A vehicle communications cable connecting to a vehicle computing system, the vehicle communications cable comprising:

one twisted pair of insulated conductors, a conductive shield, and an outer cable jacket surrounding the twisted pair of insulated conductors, said twisted pair of insulated conductors comprising two conductors each insulated by an insulating layer; wherein the insulating layers contain at least 95% w/w of fluorinated ethylene propylene (FEP) foam;

wherein the insulating layers have a substantially smooth interior surface and are in contact with the first and second conductors;

wherein the insulating layers have a dielectric constant of about 1.4 or more and less than 1.7 when at a range of temperature from about −40° C. to about 200° C. when measured by the resonant cavity perturbation technique of ASTM D2520 Method B;

wherein the conductive shield and outer cable jacket surround the twisted pair of conductors;

wherein the vehicle communications cable is an Ethernet cable in communication with the vehicle computing system; and wherein the vehicle communications cable is configured to transmit differential signals in a range of about 100 MHz to about 10 GHz.

14. The vehicle communications cable of claim 13, further comprising an inner layer of conductive shielding surrounding the twisted pair of conductors, wherein the inner layer of conductive shielding is electrically grounded.

15. The vehicle communications cable of claim 13, wherein the twisted pair is configured to deliver differential power signals and differential data signals power to sensors.

* * * * *